United States Patent [19]

Mattson

[11] Patent Number: 4,594,652
[45] Date of Patent: Jun. 10, 1986

[54] DIGITAL AUDIO DIFFERENTIAL DRIVE SYSTEM

[76] Inventor: Evert C. Mattson, Box 36, Brule, Wis. 54820

[21] Appl. No.: 545,549

[22] Filed: Feb. 28, 1984

[51] Int. Cl.$^4$ .................. H02P 1/54; H02K 17/34; G05B 19/18; G05B 13/02
[52] U.S. Cl. ................. 364/167; 364/148; 318/46; 318/48; 318/49
[58] Field of Search ............. 318/45, 46, 48, 49, 318/581; 364/167, 170, 148, 149

[56] References Cited

U.S. PATENT DOCUMENTS

| | | | |
|---|---|---|---|
| 1,667,718 | 5/1928 | Connell . | |
| 1,818,963 | 8/1931 | Tolson . | |
| 2,008,909 | 7/1935 | Hershey | 177/311 |
| 2,176,742 | 10/1939 | La Pierre | 177/311 |
| 2,260,019 | 4/1942 | Alexandersson | 172/239 |
| 2,469,786 | 5/1949 | Rieber | 318/18 |
| 2,537,427 | 1/1951 | Seid | 318/28 |
| 2,987,939 | 6/1961 | Waninger | 74/675 |
| 3,260,133 | 7/1966 | Mattson | 74/675 |
| 3,555,254 | 1/1971 | Gerber | 364/170 X |
| 3,798,519 | 3/1974 | Habisohn | 318/46 |
| 3,911,336 | 10/1975 | Diggs | 318/48 |
| 4,126,818 | 11/1978 | Taylor | 318/48 |
| 4,288,727 | 9/1981 | Whitford | 318/46 |
| 4,289,997 | 9/1981 | Jung et al. | 318/49 |
| 4,376,913 | 3/1983 | Higby | 318/49 |
| 4,387,421 | 6/1983 | Zach et al. | 364/148 |
| 4,486,693 | 12/1984 | Hamati et al. | 364/148 X |

Primary Examiner—Jerry Smith
Assistant Examiner—Jon D. Grossman
Attorney, Agent, or Firm—James Passé

[57] ABSTRACT

A motion control drive system for producing and controlling programmed and remote controlled machine operations by directing and controlling the performance of a rotating output shaft. The output shaft is then used to provide drive power and programmed control of various machine operations required to be controlled by a program of predetermined machine operating commands. The final program of operating commands being stored on audio magnetic sound recording tape or other audio recording media for purposes of storage and subsequent use in directing and controlling a given machine. The program of operating commands being stored on two track audio magnetic tape in the form of dual, first and second, time varying and or fixed frequency audio signals whose frequencies interact and become the function of the commands to be executed. The dual audio signals then being amplified and used to control a pair of high frequency, alternating current, gear head synchronous motors coupled through a differential gear train to the system output shaft such that the direction and velocity of the system output shaft can be infinitely controlled from zero to maximum speed in either direction of rotation. A general purpose digital computer being used to develop and store the machine control commands in digital form. The control commands being based upon computations performed by the computer or by an external programmer or program source. The system output shaft also capable of being remotely controlled by means of two channel radio apparatus and instrumentation. The dual time varying or fixed frequency audio signals comprising the final operating commands being transmitted and received by means of two channel radio equipment, apparatus and instrumentation.

9 Claims, 3 Drawing Figures

DIGITAL AUDIO DIFFERENTIAL DRIVE SYSTEM

BACKGROUND OF THE INVENTION

This invention relates to numerically controlled machine drives; more specifically to an improved motion control drive system for producing and controlling programmed and remote controlled machine operations. In the field of machine control technology, numerical or digital control as known today, is a significant part of everyday life. It embraces every segment of industry and extends tracking and scanning devices, weapons guidance systems, aerospace apparatus, metal working machine tools, robots and the like. By definition, numerical control or digital control, is the operation of certain machines or equipment systems by a series of coded instructions which are comprised largely of numbers. These coded instructions or commands being in accordance with the type of machine or equipment to be controlled. The present invention is a stepless, infinitely variable, programmable, numerically controlled, machine drive system that is highly compatible and easily interfaced with readily available digital computers, microelectronic processors, stereo audio sound system components and stereo radio apparatus and instrumentation. This invention is intended to be an integral part of automation in the world of industrial, military and outer space technology as we know it today.

REFERENCE TO RELATED APPLICATIONS

The present invention is a subsequent improvement over U.S. Pat. No. 3,260,133 granted to the present inventor, E. C. Mattson on July 12, 1966.

Reference is herein made to the aforementioned patent.

DISCUSSION OF PRIOR ART

Heretofore, programmable, machine drives have used digital stepping motors as a source of drive power. It is well known in the art that stepping motors are incremental devices that are powered and controlled by digital pulses and therefore cannot produce an infinitely variable, smooth, continuous path output. They are also prone to troublesome cogging and are limited in power output; also, the stepping motor cannot be remotely controlled without great difficulty and expense. Direct current motors are also used in programmable machine drive systems, especially in servo mechanisms. The direct current motors used in servo control loops have brushes, commutator and slip rings which in many cases cannot be tolerated in explosive or hostile environments, and also cannot be tolerated in many clean room operations such as found in the processing of microelectronic semiconductor wafers and chips. The D.C. motor also experiences cogging and erratic behavior at zero and low speed; speed regulation being inherently poor. Also D.C. motors cannot be remotely controlled without great difficulty and expense. There are also two phase A.C. servomotors which can be used in programmable machine drives. They are difficult and expensive to program and control especially at zero speed; and, they cannot be remotely controlled without great difficulty and expense.

All numerically controlled machine drive systems have some characteristics or features which are considered advantageous, and some that are considered undesirable. Also, a given feature of one system may be an advantage to one individual and a disadvantage to another. Be that as it may, most drive systems are making significant contributions to machine control technology today; as will be the case with the present invention.

OBJECTS OF THE INVENTION

Accordingly, several objects of the invention are as follows-

To provide a novel, yet improved, machine drive system for easy application in the design and implementation of programmed numerically controlled machines and equipment systems used for local or remotely controlled machine operations.

Another object of the invention is to provide a drive system wherein the output shaft is infinitely variable at all speeds including zero, and has a smooth continuous path output in either direction of rotation; clockwise or counterclockwise.

Another object of the invention is to provide a drive system wherein the system out put shaft will deliver a positive constant torque output value at all speeds including infinitesimal speeds approaching zero; with output shaft being locked in a stationary position at zero.

Another object of the invention is to provide a drive system wherein, starting, stopping, and reversing of the system output shaft can be accomplished without interruption or discontinuity of electrical input power.

Still another object of the invention is to provide a machine drive system wherein a "no-load" condition prevails upon start up of the overall system.

Another object of the invention to provide a drive system wherein the system output shaft can be precisely regulated under all operating conditions including fluctuating load conditions; and wherein the system output shaft will not experience cogging, jitter or other erratic behavior patterns at zero or infinitesimal speeds approaching zero.

Another object of the invention is to provide a drive system wherein the system output shaft is capable of executing upon electrical command, a complete series of machine operating functions; and wherein the system output shaft can be mathematically defined and controlled at all times.

Another object of the invention is to provide a drive system that converts machine commands, in digital form, to suitable fixed or variable frequency audio sine wave signals for controlling the output performance of the system output shaft.

Another object of the invention to provide a drive system wherein the programmed machine commands, in the form of time varying or fixed frequency audio sine wave signals, can be recorded and stored on standard audio magnetic sound tape; or other well known audio sound recording media.

Another object of the invention is to provide a machine drive system, as described, wherein the system output shaft can be remotely controlled by means of well known stereo, two channel, radiotelegraphy techniques, apparatus and instrumentation.

Another object of the invention is to provide a drive system that uses single phase, A.C. synchronous motors as opposed to digital stepping motors, or two phase or three phase A.C. motors or D.C.—direct current motors.

Another object of the invention is to provide a drive system wherein the system output shaft is synchronous with input power at all times; and wherein two or more drive units can be made to operate as coordinated slave units.

Still another object of the invention to provide a system wherein the output shaft if overloaded or forceably stalled will slip and not cause undue damage to the operating components of the system.

A further and final object of this invention is to provide a machine drive system that is highly compatible with present day digital electronic control techniques, apparatus and instrumentation; also highly compatible with stereo, two channel, audio sound system components, apparatus and instrumentation; including stereo, two channel, radiotelegraphy apparatus and instrumentation.

DRAWINGS OF THE INVENTION

The drawings of this invention include three separate figures on three separate sheets. In the accompanying drawings:

FIG. 1 illustrates one embodiment of the invention employing direct control of the system output shaft by means of a digital computer, with a two channel output, controlling a digital to audio sine wave generator, also with a two channel output, which in turn controls a pair of A.C. synchronous gear head motors driving through a bevel gear differential unit to the system output shaft to be controlled;

DESCRIPTION OF THE INVENTION

Figure 1:
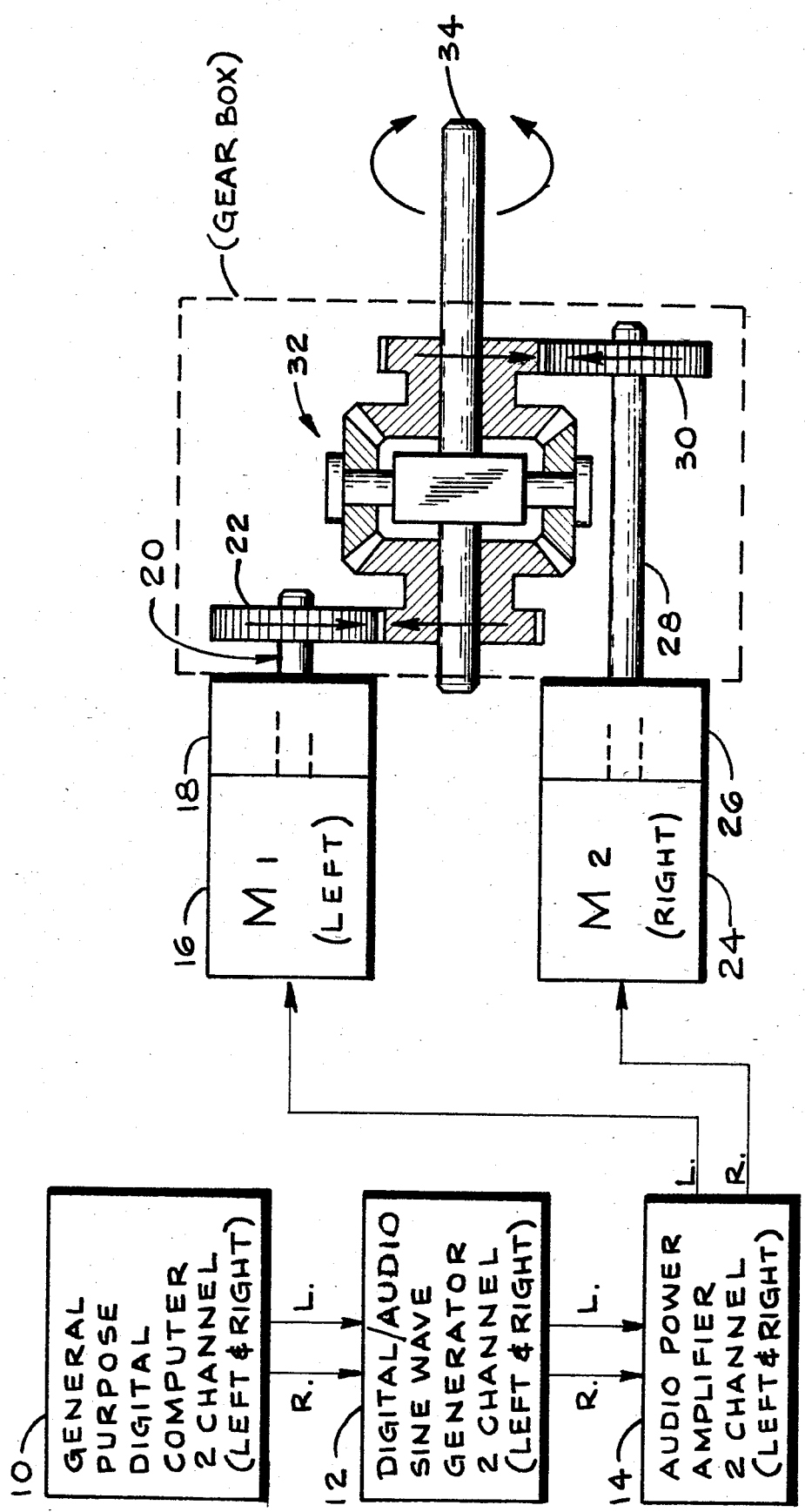

Referring now to FIG. 1, the system output shaft whose angular velocity and direction of rotation is to be controlled is indicated by numeral 34. As shown output shaft 34 is an intregal part of a bevel gear differential indicated generally by numeral 32. Differential 32 is a well known planetary gear train mechanism consisting of a cross spider member fixed to output shaft 34. A pair of bevel pinion gears rotably mounted on the cross spider member. The bevel pinion gears being in mesh with a pair of bevel side gears which are also rotably mounted on output shaft 34. Coupled to the bevel side gears are input spur gears which are also rotatably mounted on output shaft 34 along with the bevel side gears. Differential 32, as shown and described, constitutes a bevel gear differential unit with an inherent displacement ratio of 2:1. In FIG. 1 it is shown that differential 32 is driven by two motors, 16 and 24, with attached gear units, 18 and 26, respectively. The drive motors with combined gear heads are commonly referred to as gear head motors. The gear head units being only a means of reducing motor speed which for all practical purposes is necessary in applications of this invention.

As shown, the output of gear head motor 16/18 is by means of drive shaft 20 and the output of gear head motor 24/26 is by means of drive shaft 28. To transmit power to the differential there is shown spur gear 22 mounted and fixed on gear head motor drive shaft 20 and spur gear 30 mounted and fixed on gear head motor drive shaft 28. Drive gears 22 and 30 then being in mesh with the differential input spur gears. Drive motors 16 and 24 in this invention are low voltage, high frequency, single phase, alternating current, synchronous motors, wherein the motor rotor turns at the same speed as the stators revolving field; thus synchronously with A.C. frequency input. Standard commercial gear head motors well suited for this invention would be generally specified as, single phase, A.C. synchronous gear head motors designed to operate at 400 Hertz. This motor is considered to be a very high speed motor that requires an attached gear head speed reduction unit as called out by numerals 18 and 26.

Again, referring to FIG. 1, there is shown a general purpose digital computer 10 of the type including a memory, a processing unit, a control unit and an input-/output unit with the output being operative to produce a two channel output result. As known in the art, there can be stored within the memory of the digital computer 10 a program of machine instructions which operate upon data also stored in the memory in such a way as to perform mathematical computations or other logical manipulations of the data. Thus, the digital computer can be used to assist the programmer in developing a set of machine operating commands. Once these commands are developed and stored within the memory section of the computer, they become available, upon demand, to the input/output section of the computer.

Commonly contained within the input/output section of the computer is an input/output register which forms a portal through which all data coming to and exiting from the computer must pass. This register commonly comprises a plurality of interconnected bistable flip-flop stages so that it can store a word in binary representation. The two channel output of computer 10 is then connected to the input of a two channel digital to audio sinewave signal generator indicated by numeral 12. Again, as known in the art, a programmable digital to audio sinewave signal generator accepts a word in digital form at its input and operates upon this word to produce an audio signal that is directly proportional to the digital input. In this invention the digital/sinewave generator 12 will produce fixed and/or time varying audio sinewave signals whose dual, first and second, output frequencies are based on the programmed digital output from computer 10. The number of complete sinewave alternations per second from the left and right side of the digital/sinewave generator 12 is then a direct function of the left and right side ouput of digital computer 10.

It will be evident to those in the art that computer 10 and digital/sinewave generator 12 can be combined as one integral unit and that computer 10 can be replaced by some other digital source. The dual output from the digital/sinewave generator 12 is then fed through an audio power amplifier 14 also having two channels, left and right. Power amplifier 14 is essentially the same as used in well known two channel stereo audio sound systems and herein serves the purpose of amplifying the audio signal from a low power constituent to suitable alternating current power necessary to drive syncronous motors 16 and 24. The output from the left side and the right side of power amplifier 14 is then essentially single phase, alternating current power.

As shown, the output from the left side of amplifier 14 is fed to synchronous motor 16 and the output from the right side is fed to synchronous motor 24.

As previously discussed, motors 16 and 24 are specified as low voltage, high frequency, (400 Hertz) single phase alternating current synchronous motors wherein motor speed is directly proportional to applied A.C. frequency. The motors, as described are commonly classified and considered to be single speed motors which are designed to operate on a fixed frequency. It has been found, however, that standard motors of this type will operate, to a limited extent, at variable frequencies (variable speed) above and below their rated fixed frequency. The extent to which the motors can be driven above and below their rated fixed frequency is first based on a known plus or minus frequency tolerance established by commercial and U.S. military requirements and designed into the motors. It will also be evident to those in the art that the given plus or minus frequency tolerance can be exceeded by simple design changes in motor circuitry by changing resistance and capacitance. The present invention relies on the fact that motors 16 and 24, as described, can be varied, to some extent, above and below their given single speed fixed frequency without losing power or experiencing deleterious effects. Because of this fact the present invention can be made to operate as a simple, single phase, alternating current, infinitely variable, low-speed, synchronous system.

Figure 2:
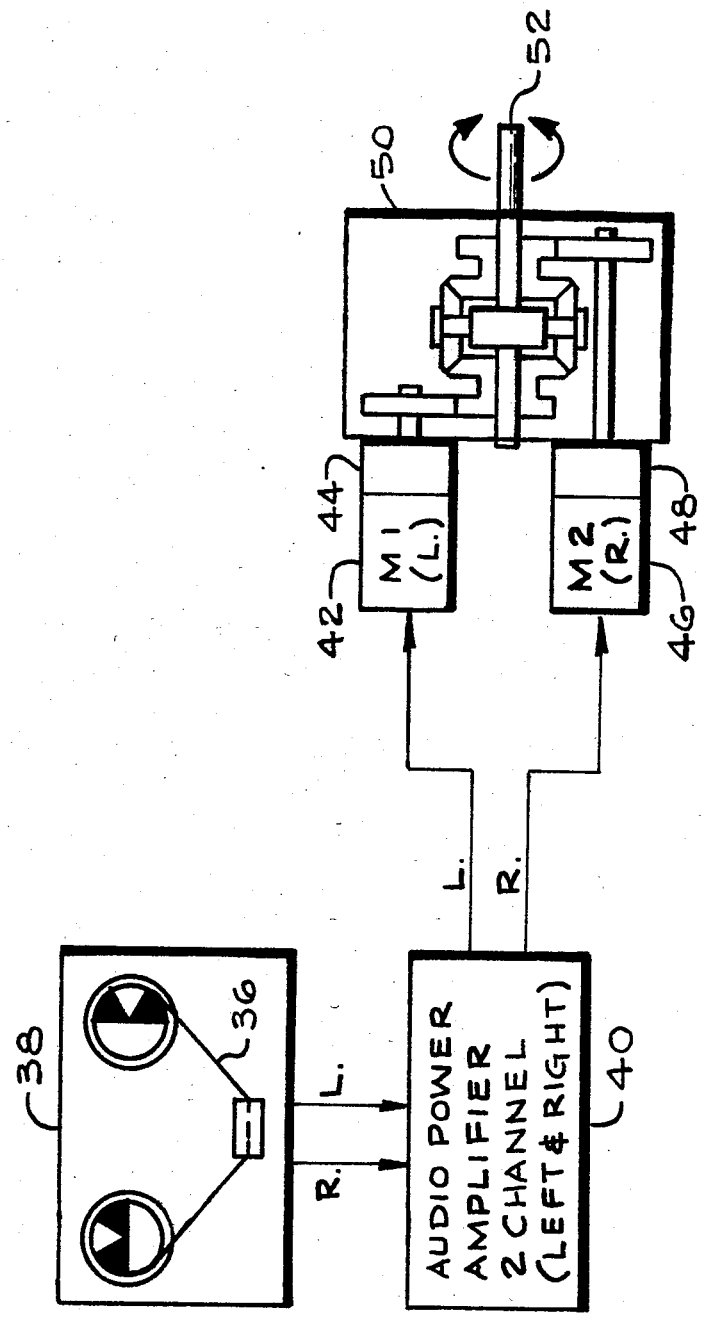
FIG. 2 illustrates another embodiment of the invention wherein dual, first and second, audio sinewave signals pre-recorded on two track magnetic tape is used to control the differentially driven system output shaft.
Figure 3:
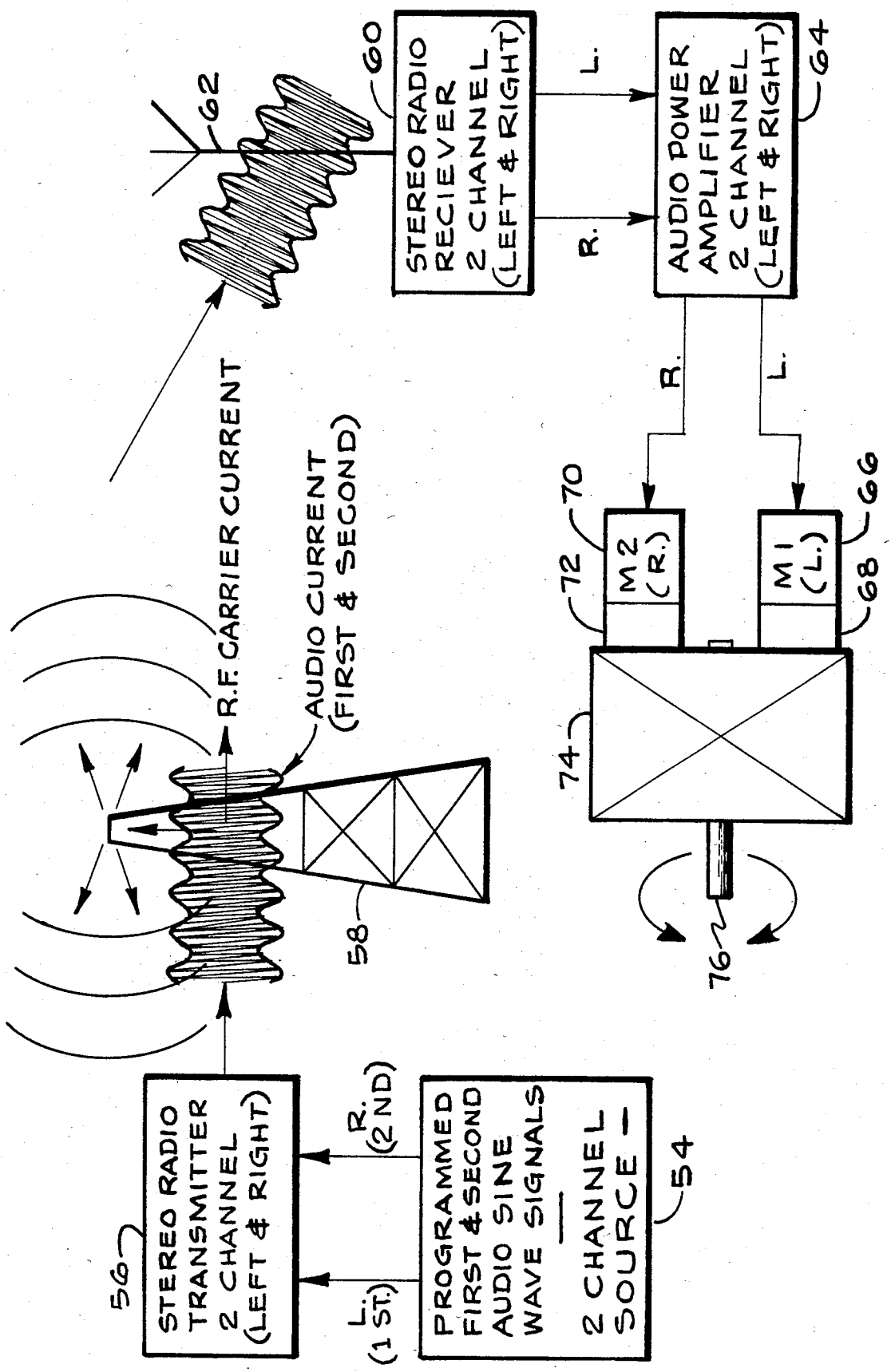
FIG. 3 illustrates still another embodiment of the invention wherein the system output shaft is remotely controlled by means of dual, first and second, audio sinewave signals being transmitted and received by stereo, two channel, radio apparatus and instrumentation.

Referring now to FIG. 2, there is shown an embodiment of the invention wherein a pre-recorded magnetic tape 36 having a program of machine operating commands recorded thereon is used to control the performance of the differentially driven system output shaft. Magnetic tape 36 is a two track audio magnetic sound tape essentially the same as used in general purpose stereo music and voice recording. The pre-recorded program on tape 36 will be in the form of dual, first and second, time varying or fixed frequency audio sinewave signals. As shown the variable or fixed frequency signals may then be played back by means of an audio magnetic tape player reproducer indicated by numeral 38. Tape player 38 is also operable as a two channel unit to handle and process the dual audio signals from magnetic tape 36. The dual signals, (left and right), emitting from tape player 38 will then be fed into an audio power amplifier 40, which again has a two channel arrangement. The two channel output, left and right, from amplifier 40 is again used to separately power and control two gear head synchronous motors 42/44 and 46/48 whose output shafts are coupled to a bevel gear differential unit 50 which incorporates the system output shaft 52 to be controlled. In this embodiment, power amplifier 40, A.C. synchronous gear head motors 42/44 and 46/48, and differential unit 50 incorporating the system output shaft 52 are the same as shown and described in the foregoing technical discussion covering FIG. 1. In either of the embodiments, performance of the system output shaft 34 and 52 will be the same; which is the function of the difference in speeds of the two motors. It will also be evident to those in the art that magnetic tape 36 and tape player 38 can be replaced by other existing two track, two channel, audio sound recording and replay media capable of handling first and second audio sine wave signals. Referring now to FIG. 3, there is shown another embodiment of the invention wherein the system output shaft is remotely controlled by means of dual, first and second, time varying and/or fixed frequency audio sinewave signals being transmitted and received by two channel radio equipment, apparatus, and instrumentation. In FIG. 3, there is shown programmed first and second audio sinewave signals from a two channel source, herein indicated by numeral 54. The audio sinewave signals from source 54 will, again, be in the form of dual, first and second, time varying and or fixed frequency signals which represents the machine operating commands to be executed. Source 54 can be in the form of a programmable, two channel, digital to audio sinewave signal generator that is computer and or micro processor controlled; or from a pre-recorded, two track, audio recording tape, or disc, or platter; or from any other source of controlled audio sinewave signals, including live sound. The dual time varying and or fixed frequency audio sinewave signals, left and right, from source 54 are then fed directly into a two channel radio transmitter 56. Radio transmitter 56 being essentially the same as used in two channel stereo radio operation. In the makeup of stereo radio sound transmission, two separate sources of audio sound is directed into separate microphones; left and right. The microphones then convert the audio sound into changing electrical current commonly referred to as voice or audio current. In this embodiment of the invention, audio sound and microphones are replaced by source 54; which again, is programmable on site, or pre-programmed and recorded at some other location.

Again, the two channel program of machine commands in the form of dual, first and second, time varying and or fixed frequency audio current signals from source 54 are fed directly into radio transmitter 56. It is known in the art a that standard radio transmitter, as known today, produces a very high frequency alternating current referred to as carrier current. Its frequency is fixed and assigned to the radio broadcasting station. It is also known that within the radio transmitter the audio current is added or combined with the carrier current and is then amplified and sent to the transmitting tower or aerial as depicted herein by numeral 58. At the broadcasting aerial the carrier current travels up and down the aerial. In so doing, it sets up rapidly changing lines of force around the aerial. Lines of force that change direction so very rapidly that they bubble off into space and float loose from the aerial, traveling away from it in the form of waves, known as radio waves. The radio waves combined with the audio current then travel in all directions away from the aerial at a speed of 186,000 miles per second. The audio current having been combined with carrier current is then said to be "riding on the back" of the carrier current into space.

In the present invention radio transmitter 56 and aerial 58 is essentially the same as found in present day stereo radio broadcasting stations. To those in the art it will be evident that a two channel radio transmitter designed and built for purposes of this invention could be much smaller and far less complicated than standard radio broadcasting stations. The general principles and technology, however, will be essentially the same. Again referring to FIG. 3, there is shown a two channel stereo radio receiver 60 with attached receiver aerial 62. The two channel radio receiver 60 is, again, essentially the same as used in present day, standard, stereo radio receivers. As with all radio receivers the receiver aerial has currents induced in it by the radio waves from all nearby broadcasting stations. The radio receiver is then set or adjusted to select the carrier current to be received; and blocks off the carrier current leaving only the first and second audio current. The audio current in this embodiment is again amplified within a two channel audio power amplifier 64. The output of amplifier 64 again being in the form of first and second single phase alternating current power at time varying or fixed frequencies which again represents the program of machine commands to be executed.

As shown the output from the left side of amplifier 64 is then fed to single phase A.C. synchronous gear head motor 66/68 and the output from the right side of the amplifier 64 is fed to single phase A.C. synchronous gear head motor 70/72. As shown the gear head motors are again coupled to a bevel gear differential indicated generally by numeral 74 which incorporates the system output shaft 76.

Gear head motors 66/68 and 70/72, differential 74 and output shaft 76 are the same as shown and described in FIG. 1. System output shaft 76, in this embodiment, will again operate and perform in the same manner as previously discussed.

It will now be evident to those in the art that the present invention can utilize standard stereo sound system audio components including stereo radio.

Those in the art will also realize that present day Hi-Fi stereo components, as such, have certain refinements and circuitry not all necessary in the operation of this invention. The fact remains, however, that standard stereo components are readily available and relatively inexpensive and will work very well in certain case applications of this invention. In other cases, system components can be detail designed and built to suit this system as invented and shown.

Components of special design would be along the same lines, using the same principals of technology used in the design of standard Hi-Fi stereo components but would be less sophisticated and refined; but, again, essentially the same as modern day Hi-Fi stereo audio components and stereo radio.

OPERATION OF THE INVENTION

Referring again to FIG. 1. As shown by directional arrows differential 32 is being driven in opposite directions by A.C. synchronous gear head motors 16/18 and 24/26. It is known in the art that a differential unit, as described, can transmit power at varying ratios of input to output speeds and if the speed of any of its two elements are controlled, the speed of the third element can be varied progressively from design maximum in one direction of rotation through zero to design maximum speed in the opposite direction of rotation; or from zero to maximum speed in either direction of rotation. In the present invention the differential system output shaft 34, 52 or 76 will rotate at a speed which is a function of the difference in the speed of the two A.C. synchronous gear head motors.

More specifically the system output shaft will rotate at a speed which is one half the algebraic sum of the speeds of the two gear head synchronous motors. When both motors are running at exactly the same frequency/speed the system output shaft will be locked in a stationary position at zero. The overall reversing speed range of the system output shaft, from zero to maximum design limits, in either direction of rotation can then be accomplished by driving the synchronous gear head motors at speeds above and below their given fixed frequency speed by means of the dual, first and second, time varying or fixed frequency A.C. power outputs from the power amplifier.

Controlling angular velocity of the system output shaft—acceleration, deceleration, stopping—starting and reversing according to a specific program of machine operating commands is then accomplished by programming computer 10 which in turn will feed the digital to sinewave generator 12 which in turn will produce a dual stream of programmed time varying or fixed frequency audio sinewave signals. The dual, first and second, audio signals being programmed to work co-operatively as a unified team in controlling the performance of the differentially driven system output shaft. It is also known that the motor, (M1 or M2), running at the faster speed is always the positive driver of the system output shaft, and the direction of rotation of the system output shaft is governed by the fast motor. The motor (M1 or M2) running at the slower speed is then taken as a negative factor or as the systems differential subtractor. In the present invention the slow speed motor (M1 or M2) also acts as a power brake controlling the overhauling negative circulating load power condition prevalent in all differential systems of this type. It can be readily seen, by tracing the differential power path, that the so called negative circulating power is overrunning the slow speed motor. Negative circulating power is the power that a planetary gear train feeds back on itself. It cannot be prevented and it cannot be used; it must be harnessed and controlled.

As known in the art, A.C. syncronous motors as described herein will perform the same under positive or negative (overrunning) load conditions. Without the synchronous motors the system output shaft would be unstable. In the present invention the A.C. synchronous gear head motors provide positive control of the so called negative circulating power. Referring now to computer 10, FIG. 1. In programming computer 10 along with digital/sinewave generator 12 the programmer must have a clear understanding of the principals of operation involved in the present system. It is then the programmers function to study the required necessary operations and then visualize the best sequence of machine procedures to be followed. The programmer will then convert the required machine motions and functions into series of coded instructions which represent every movement, path and action the machine must make to properly execute the motion programs described by the original work requirements. Once the programmer or program source has established the detailed commands or instructions, they can be stored in a suitable memory such as the magnetic core memory of a digital computer or other digital recording means. In fact, through the use of a general purpose digital computer, it is possible to have the computer itself develop the machine control signals or commands based on computations performed by the computer. In the preferred embodiment of the invention, the machine commands are first developed in binary code and stored either in the memory of a general purpose digital computer or on digital tape or other digital recording media. In turn, the programmed first and second time varying or fixed frequency audio sinewave signals from the digital/sinewave generator 12 can be recorded on two track audio magnetic sound tape as shown in FIG. 2. Where economic considerations cannot justify the expense of a general purpose digital computer and a programmable digital/sinewave generator along with a trained programmer; the audio magnetic tape, as described in FIG. 2, can be generated by persons other than the machine users who are trained and equipped for this purpose, and then sold to the machine user. Alternatively the system output shaft can be programmed by visual and manual means without the aid of a computer. Wherein, direct human control can be used to guide the output shaft or driven machine through a series of motions by visually and manually manipulating the output of digital/sinewave generator 12 and again recording the results on two track audio magnetic sound tape.

To accomplish this method of programming the digital/sinewave generator must be equipped with left and right hand manual controls such as left and right hand pistol grip handles or joy stick controls along with a video screen display to guide the operator and to determine the program output. The manually controlled two channel output from the audio signal generator again being recorded on two track audio magnetic tape as previously discussed. Needless to say this mode of operation is tricky; but possible. When one considers why it is that we have two eyes and two ears for seeing and hearing and two sides to the human brain, the answer is stereo—the perception of depth; with this in mind it is possible.

Irrespective of the manner in which the audio magnetic tape is produced, it is preferrably two channel arrangement having a series of dual, first and second, programmed time varying or fixed frequency audio signals recorded thereon. The dual variable or fixed frequency audio signals may then be played back from the magnetic tape by a playback unit and amplified by a suitable power amplifier to again provide two channel single phase alternating current power for separately controlling the gear head synchronous motors whose output shafts are coupled through a bevel gear differential train incorporating the system output shaft to be controlled. Again, in all embodiments of the invention, the performance of the system output shaft will be a function of the difference in speed of the two gear head synchronous motors. The motors being programmed as separate entities to perform co-operatively as a unified team in producing infinitely variable motion at the system output shaft. Operation of the invention, as shown in FIG. 3, wherein the system output shaft is radio controlled will now be very evident to those in the art. Operation will be essentially the same as employed in stereophonic sound recording, transmitting and receiving, in place of live sound and microphones used in stereo sound recording and broadcasting. The present invention introduces first and second audio sine wave signals programmed to provide infinite control of the system output shaft. The output from the two channel audio signal source is essentially the same as live sound audio current which can be fed directly to a two channel radio transmitter where it is combined with a high frequency radio carrier current and then broadcast or sent over radio waves to be received by a compatible two channel stereo radio receiver with an audio power amplifer located at the differentially driven system output shaft to be controlled. In this embodiment of the invention (FIG. 3) the audio signal source 54, the power amplifier 62 and the gear head synchronous motors and the bevel gear differential unit incorporating the system output shaft are essentially the same as previously shown and discussed in FIGS. 1 and 2. While the present invention has been illustrated in a machine control environment, it will be immediately apparent to those skilled in the art that a drive system as described herein may have wide applications in other fields such as servo mechanisms and instrumentation. While the foregoing description contains many specifics, these should not be construed as limitations on the scope of the invention, but rather as an exemplification of certain preferred embodiments hereof.

Many other variations are possible; for example, the bevel gear differential, as described, can be replaced with any type of planetary gear train that has two inputs resulting in differential motion output. Or the bevel gears as shown in the bevel gear differential can be replaced with spring loaded tapered cones without gear teeth.

Next, the computer, the digital/sinewave generator and the power amplifier as shown and discussed in FIG. 1 can all be combined as a single integral unit wherein the computer might well be in the form of a programmable micro computer or a dedicated micro electronic processor. Accordingly, the scope of the invention should be determined not by the embodiments illustrated, but by the appended claims and their legal equivalents.

What I claim is:

1. A continuously infinitely variable speed, dual input mechanical differential digital control system with differentially driven output shaft comprising:
   (a) A matched pair of alternating current single phase single output synchronous electric motors of fixed frequency wherein the motors have a plus or minus frequency tolerance range which allows input frequency of alternating current power to vary above and below the fixed frequency of the motors, the motors outputs engaging in opposite directions the inputs of a mechanical differential;
   (b) means for computing and producing a programmed pair of digital electronic pulses, said pulses having a binary mathematical representation for controlling the speed of the differentially driven output shaft;
   (c) means for producing a pair of varying audio frequency signals from the respective varying digital electronic pulses wherein the varying audio frequency signals are proportional to the varying digital electronics pulses and within the frequency tolerance range of the synchronous motors;
   (d) means for inputting the varying audio frequency signals to the motors such that the motor outputs can be varied continuously in speed and the differentially driven output shaft speed controlled according to the digital electronic pulses; and
   (e) the differential having dual inputs for the synchronous motors and one output and wherein the differential output speed is one half the algebraic sum of the motor inputs, the ouput capable of a forward, reverse or zero output.

2. A control system according to claim 1 wherein the varying audio frequency signals are inputted by remote control means.

3. A control system according to claim 1 wherein the remote control means is a two channel radio telegraphy apparatus.

4. A control system according to claim 1 wherein the varying audio frequency signals are inputted by local control means.

5. A local control means according to claim 4 wherein the varying audio frequency signals is an audio sound signal.

6. An audio sound signal according to claim 5 which further comprises a prerecorded audio sound signal.

7. A control system according to claim 1 wherein the speed of the synchronous motors is equal to 120 times the frequency input divided by the number of motor poles.

8. A control system according to claim 1 wherein the frequency tolerance zone is about plus or minus five percent.

9. A control system according to claim 1 wherein the synchronous motors operate at a frequency of 400 Hz.

* * * * *